United States Patent [19]

Geiger

[11] Patent Number: 5,464,635
[45] Date of Patent: Nov. 7, 1995

[54] BLOW MOLDING MACHINE

[75] Inventor: Albert Geiger, Garmisch-Partenkirchen, Germany

[73] Assignee: Geiger Technik GmbH, Garmisch-Partenkirchen, Germany

[21] Appl. No.: 197,878

[22] Filed: Feb. 17, 1994

[30] Foreign Application Priority Data

Feb. 25, 1993 [DE] Germany .......................... 43 05 735.7

[51] Int. Cl.⁶ .................................................. B29C 49/30
[52] U.S. Cl. .......................... 425/532; 264/531; 425/534
[58] Field of Search ..................................... 425/532, 522, 425/185, 190, 186, 192 R, 534; 264/531, 540

[56] References Cited

U.S. PATENT DOCUMENTS

| 4,239,474 | 12/1980 | Nakagawa | 425/525 |
| 4,777,006 | 10/1988 | Wenger et al. | 264/526 |
| 5,030,083 | 7/1991 | Kohno et al. | 425/532 |
| 5,208,049 | 5/1993 | Hatfield et al. | 425/532 X |
| 5,288,224 | 2/1994 | Yamamura et al. | 425/532 X |

FOREIGN PATENT DOCUMENTS 3737453  5/1988  Germany .

OTHER PUBLICATIONS

Kunststoffe, Bd. 78, No. 12, Dec. 1988.

*Primary Examiner*—Richard L. Chiesa
*Attorney, Agent, or Firm*—Jacobson, Price, Holman & Stern

[57] ABSTRACT

To avoid any displacement of the heavy extruder with the blow head or of the heavy mold closing support with blow mold in three planes that are perpendicular to one another, which displacement has so far been necessary in the production of multiaxial hollow plastic articles, such as curved tubular pieces, the invention suggests the provision of a movable premold or intermediate mold which is matched to the shape of the mold cavity of the blow mold and includes a mold trough which is open at the blow head side, namely between the tube or blow head and the blowing station including a blow mold with a horizontal parting plane, the premold being at least displaceable in the tube receiving position below blow head in two directions (X and Y axes) which are horizontal relative to one another, and being adapted to be lifted and lowered (in the Z axis) and the bottom of said premold being movable over the cavity of a mold part for releasing the parison, e.g., in that the premold bottom consists of one or more doors.

17 Claims, 2 Drawing Sheets

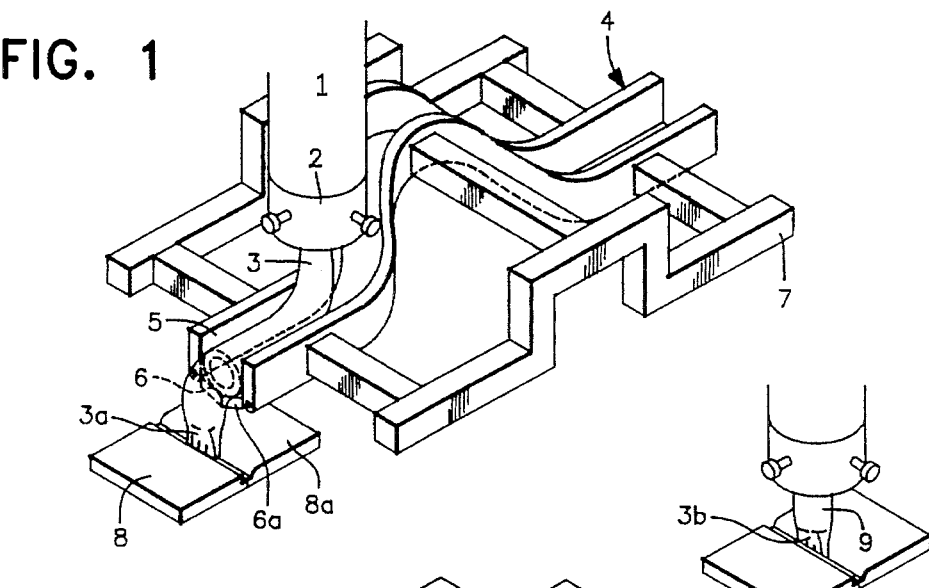
FIG. 1
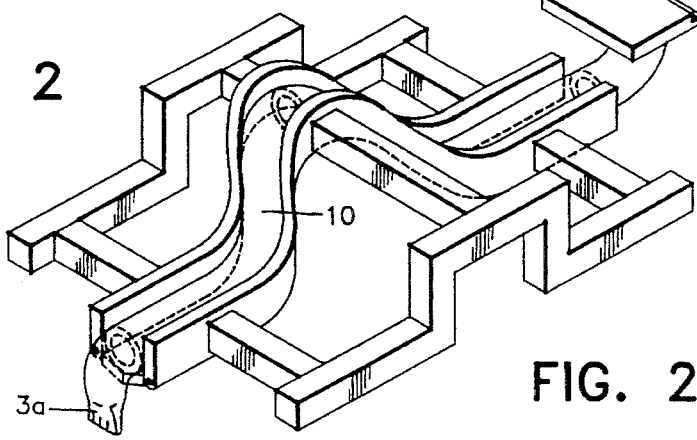
FIG. 2
FIG. 2a
FIG. 3
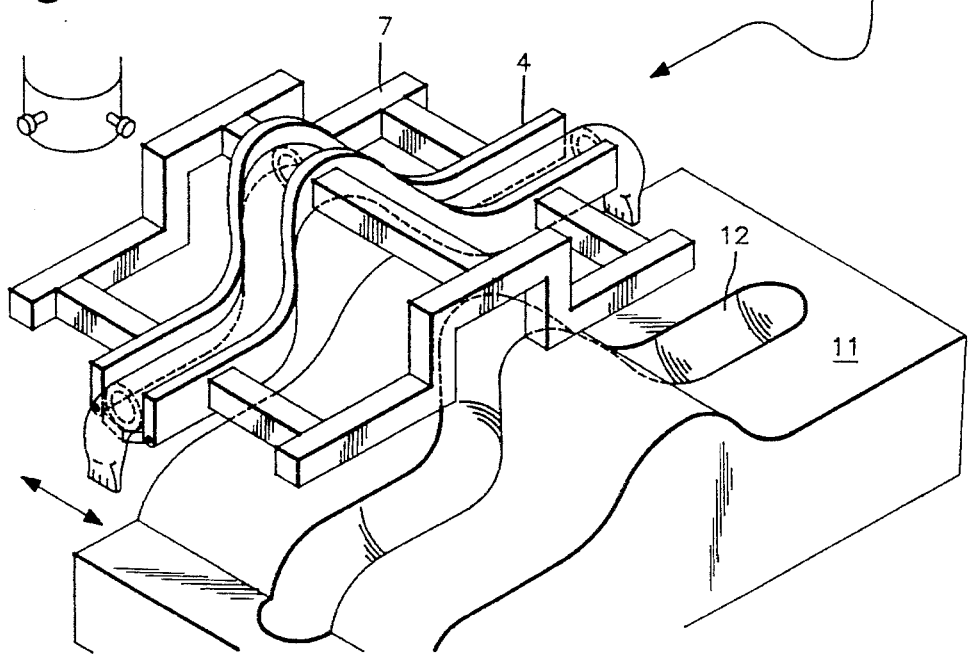

BLOW MOLDING MACHINE

BACKGROUND OF THE INVENTION

As a rule, hollow plastic articles are produced in blow molding processes in such a way that the starting material which is plasticized in an extruder by the action of pressure and heat is molded in a so-called "blow head" or "tube head" downstream of the extruder into a tubular skein and squeezed vertically downwards from the nozzle of the blow head, from which sections are introduced individually as parisons into the mold cavity of a divided and opened blow mold, the parisons being expanded, after the blow mold has been closed, into hollow plastic articles of the desired shape by introducing a blow medium by means of a blow pin or a blowing needle until contact is established with the wall of the mold cavity. The parts of the blow molds, most of the time blow mold halves, are replaceably mounted on mold supporting plates or closing plates which, guided on struts, are displaceable, most of the time hydraulically, relative to one another by opening and closing the blow mold. The unit which consists of the mold supporting plates, the guide struts, the mold parts and the movement mechanism is designated as a "mold closing support". In most of said machines, the extruder with the blow head is at a standstill while the whole mold closing support can be moved back and forth between the blow head and the blow unit consisting of the blow pin or blowing needle and the movement mechanism therefor, i.e., the empty opened mold can be moved towards the blow head for receiving a parison and then moved back into the so-called "blowing station" in its closed state with a parison being supported in the cavity of the blow mold.

Although such a blow molding machine normally permits not only the production of rotationally symmetrical articles, it permits only the production of such articles that have a main axis only, e.g. bottles, small bottles, canisters, wide-necked vessels (resembling jam jars), and so-called "technical parts" having one main axis, such as tanks, receptacles for the front and rear window cleaning liquid, braking oil vessels, armrests etc., in the car manufacturing field. Deviating forms, such as bottles with a handle, watering cans, etc., can then be produced in the already described process when the areas which are positioned between the main body and the molded part, can be "pinched off", i.e., for instance, in the case of a watering can the area inside the handle and in the case of the spout the area between the main body and this spout. This means the possibility of squeezing these areas of the tubular parison in the blow mold during closing of the mold in such a way that they can easily be removed from the mold after the sufficiently cooled hollow plastic article has been removed.

When, apart from the production of hollow plastic articles which are predominantly used for packing or for accommodating liquids and bulk materials, i.e., all kinds of bottles, tablet tubes, cans, canisters, etc., the plastics blowing technology started to deal with the manufacture of technical parts, the desire for being capable of producing hollow plastic articles having a plurality of axes arranged at angles and spatially with one another continually increased. Tubular pieces that are bent once or several times could here be mentioned as the most simple example thereof, which pieces, however, were very difficult to produce or could not be produced at all with the prior-art machines, depending on the respective form and size.

The difficulty encountered most of the time consists, not in the expansion of the parison inside the mold, but in the introduction thereof into the blow mold. It is here no longer possible to squirt only one tubular piece with a sufficient length vertically downwards with the aid of the blow head, to move said tubular piece still attached to the supply between the opened blow mold with a vertical parting plane, then to close the mold and to separate the parison inside the closed mold from the supply by closing the mold or thereafter. When hollow plastic articles are produced with a plurality of axes, the parison must rather be inserted into the correspondingly multiaxial and partial mold cavity of a blow mold part and said blow mold part must be positioned horizontally or obliquely to this end. Since the mold cavity corresponding to the hollow plastic article to be made has more than one axis, and since these are at angles within the space, i.e. the cavity may consist of a plurality of sections extending upwards and downwards at both sides, either the horizontally or obliquely positioned mold cavity must be moved back and forth and also upwards and downwards during the straight-lined discharge of a parison or these movements have to be performed by the extruder when the mold is at a standstill. Since in the prior art the whole mold closing support or the extruder with the blow head is moved in three axes perpendicular to one another, considerable weights have to be moved even in the case of relatively small articles to be produced, because both the mold closing supports and the extruders weigh tons—even in the case of small machines. An example of this prior art is given in U.S. Pat. No. 4,239,474. In the blow molding machine of this publication the mold is arranged with a horizontal parting plane and can only be moved in the Z axis within its mold closing support apart from being opened and closed as a whole, i.e., it can only be lifted or lowered. The movements in the X and Y axes are performed by displacements of the extruder with the coupled blow head. In a modified embodiment, the movement in the Z axis is not performed by lifting or lowering the mold closing support, but by vertically displacing the blow head relative to the extruder. While with the first-mentioned type the horizontally split mold can be opened and the horizontally positioned lower mold half becomes accessible to the extruder after the upper half has been unfolded, the horizontally positioned lower mold half is moved in the second embodiment along a straight or curved path out of the area of the upper mold half vertically positioned thereabove so as to become accessible to the moved extruder with the blow head. This apparatus has the fundamental disadvantage that a plastically moldable tubular parison of plastics which is suited for the subsequent blowing into a hollow plastic article and which is discharged horizontally from the blow head nozzle is always more difficult to handle than a tube vertically squirted downwards from the nozzle of the blow head, and has to be introduced into a mold cavity, a difficulty which becomes even greater with mold cavities for multiaxial hollow articles. In an embodiment in which the horizontally positioned lower blow mold half is moved along a curved path, normally a circular path, and filled into a station and closed in another station, it is disadvantageous that the time is relatively long until the upper mold half is moved onto the lower mold half, whereby the mold is closed. The parison remains, so to speak, in the lower mold half and is cooled on the contact surface with the mold cavity with time, whereby problems might arise during the subsequent blowing process. It should here be noted that the mold halves in all blow molding machines are always cooled by inner cooling channels for rapidly cooling the finish-blown part and therefore remain relatively cool all the time, i.e. also when moving from one station to the next one.

This has been regarded as such a considerable disadvantage that in some cases preference was given to the production of multiaxial hollow articles not with the aid of such a troublesome apparatus, but with pinched-off areas according to the method described above with reference to the example of the production of watering cans if the axial extension of said articles was not too complicated. However, it goes without saying that excessively large pinched-off surfaces are obtained at any rate with an amount of material that is very great in comparison with the amount of material of the finished hollow article and has to be severed after removal from the mold and cooling, which is of course a great disadvantage.

SUMMARY OF THE INVENTION

It is therefore the object of the present invention to provide a blow molding machine of simple construction in which neither the blow mold nor the extruder need be moved for the reception of the parison in the horizontal plane in several directions and lifted or lowered in the vertical plane.

BRIEF DESCRIPTION OF THE DRAWINGS

The invention is illustrated in the drawings with reference to an embodiment that does not lay claim to completeness, and is described hereinafter with reference to said embodiment. There is shown in a respectively parallel perspective view in FIG. 1 the parts which are of importance to the invention and belong to a machine according to the invention in an initial reception phase of a tubular parison;

FIG. 2 the parts according to FIG. 1 in the final reception phase of the parison;

FIG. 2a a feed diagram of the unit of FIGS. 1 and 2;

FIG. 3 the machine according to the invention during the transfer of a parison from the parison receiving position into the blowing position;

DETAILED DESCRIPTION OF THE PREFERRED EMBODIMENTS

Figure 4:
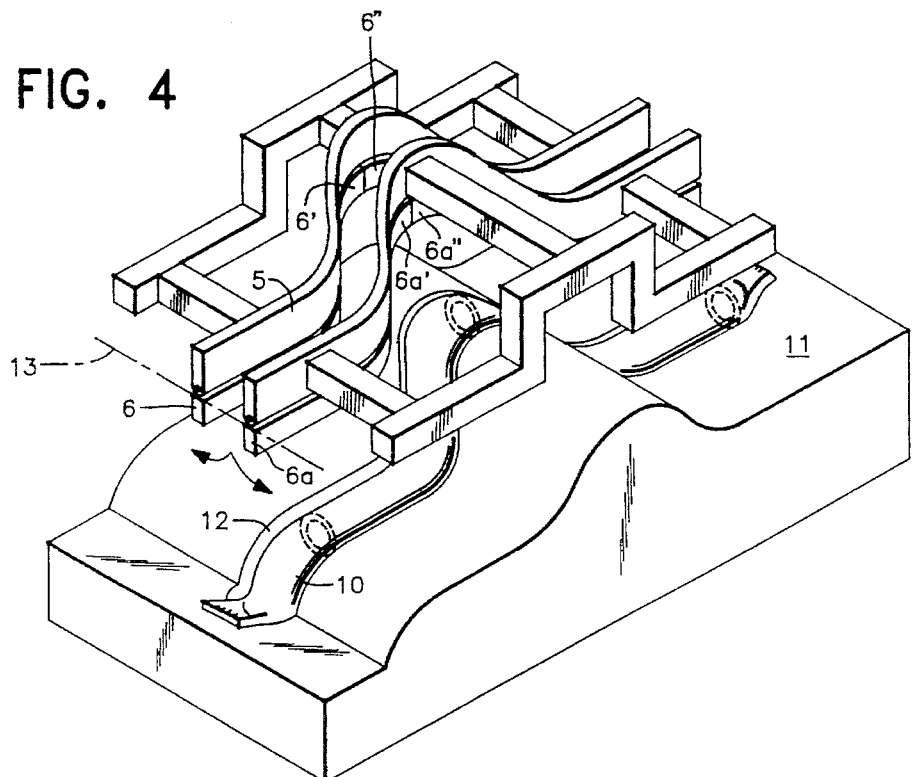
FIG. 4 the machine according to FIGS. 1–3 after the parison has been discharged in the blowing station into the cavity of a blow mold half.

In FIG. 1, 1 designates a blow head arranged downstream of an extruder, from whose nozzle positioned in nozzle ring 2 a heat-moldable tube 3 is continuously squirted downwards.

4 designates a premold whose mold trough 5 is almost identical or similar to the shape of the hollow plastic article to be produced, in particular, corresponds thereto with respect to the axial extension. The lower end of mold trough 5 and thus the support for the squeezed-out tubular piece are formed by a means which releases the parison from trough 5 in a controlled manner and at the right moment. In the illustrated embodiment, this means is constituted by two pivotable bottom doors 6 and 6a.

Premold 4 including mold trough 5 is to be made of a material that is not attacked by the parison which is still hot, but premold 4 need not be made from a material of such a high quality as that of the blow mold parts and need not have the dimensions thereof because it is not acted upon by clamping forces and does not accommodate any cooling channels.

According to the invention, premold 4 is mounted on a simple and, in particular, lightweight frame, which is only diagrammatically outlined in the drawing, e.g., on a frame 7 which consists of thin rectangular tubes and which can be moved on rollers or wheels (not shown) along rails (not shown) with the aid of small-sized simple motors, such as simple servomotors, for receiving the tube and for movement between the tube receiving means and the blow mold.

One can also see in FIG. 1 how the lower end 3a of tube 3 has been squeezed between two horizontally displaceable clamping plates 8, 8a and closed thereby. Moreover, FIG. 1 illustrates a position in which premold 4 with its supporting and traveling frame 7 has already been moved to some extent in the Y axis and that an initial tubular piece has thus been inserted into the first section of mold trough 5.

The end of the inserting operation below blow head 1, 2 is shown in FIG. 2. To this end, the supporting and traveling frame 7 has moved in the Y direction below blow head 1 and also back and forth in the X axis if this is necessary for the shape of the parison, finally also upwards and downwards in the Z axis, which can be accomplished because of the small weight of the preform and its supporting frame 7 under small efforts. The movements of premold 4 and of the supporting and traveling frame 7, respectively, according to FIG. 2 in the X, Y and Z axes are illustrated in the diagram of FIG. 2a.

While the tubular piece 3 is being discharged from the nozzle in nozzle ring 2 of blow head 1 and inserted into the mold trough 5 of premold 4 which is moved back and forth as well as up and down below blow head 1, so-called "support air" which ensures that the tubular piece does not collapse in trough 5 after its upper end 3b has been squeezed by clamping plates 8, 8a is admitted into the tubular piece through the nozzle in the blow head. Parison 10 is formed by said squeezing action at end 3b by separation from supply 9 of parison 10.

It should here be noted that it is only for reasons of space that FIGS. 1–3 are to be displaced in the drawings relative to one another such that the respective illustrations of blow head 1 with nozzle ring 2 are not positioned one below the other in a vertical line. Extruders with blow head 1 are actually at a standstill, and premold 4 with mold trough 5 is displaced on frame 7.

As illustrated in FIG. 3, premold 4 is now moved on its frame 7 with parison 10 positioned inside trough 5 in the X axis from the position below blow head 1 into the blowing station over the lower part 11 of the blow mold with mold cavity 12 to such an extent that premold 4 is exactly positioned above cavity 12. This position is illustrated in FIG. 4. In this position the bottom doors 6, 6a of mold cavity 5 are pivoted away from each other in the direction of the arrow, whereby parison 10 is released and can drop into cavity 12 of mold part 11. Since the premold trough 5 is already matched to the shape of the hollow plastic article to be produced and thus to the various axes thereof, i.e., the curvature to the left and right and upwards and downwards, the tubular parison 10 is also matched to this shape which it will not lose despite its heat moldability along the short path in the Z axis between mold trough 5 of premold 4 and cavity 12 of blow mold part 11.

FIG. 4 also illustrates that the bottom gates are bound to consist of segments 6–6a, 6'–6a', 6"–6a" over the length of the mold to match with the curvature of the premold. The doors 6, 6a may be opened simultaneously or shortly one after the other, depending on the shape and size of the parison 10 and thus of premold 4.

Instead of bottom doors 6, 6a . . ., other release elements may also be provided for the parison, e.g., a steel sheet (not shown) which closes mold trough 5 downwards in plane 13 and which in the position illustrated in FIG. 4 can be withdrawn laterally in this plane for releasing the parison and can then be pushed back again. Likewise, a continuous door 6 which is possibly subdivided into segments in accordance with the course of the trough can of course be used instead of two semidoors 6, 6a. The bottom doors or their segments 6–6a, 6'–6a', 6"–6a", etc. may also consist of teeth or pins arranged in the form of a rake, with the teeth or pins of the one door, e.g. of door 6, filling the gaps of the teeth or pins of the opposite door 6a, so that in the closed state they form a closed bottom in meshing engagement with one another. Another development of this concept provides for pins or teeth that are secured to a rotatable element extending over the whole length of the preform and following axial deviations, as is readily available to every person skilled in the art.

Figure 5:
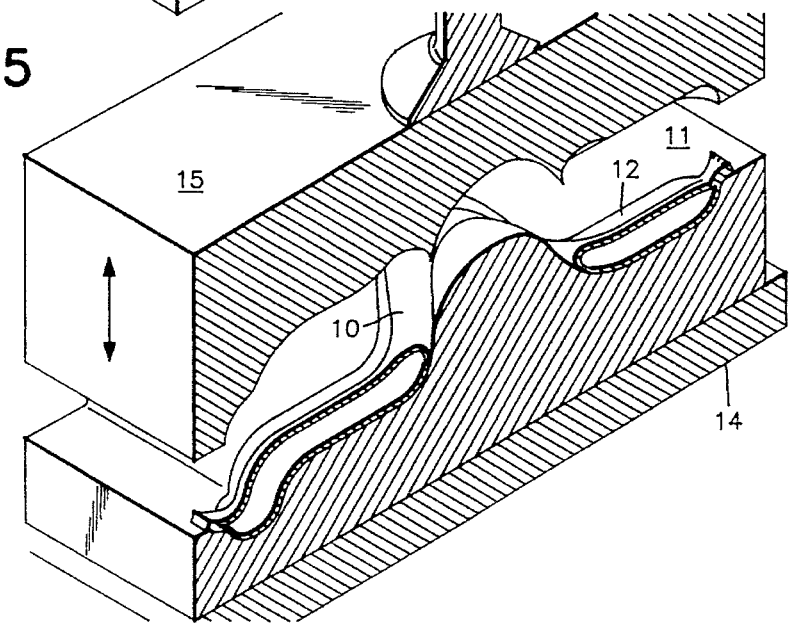
FIG. 5 a blow mold unit with a parison inserted into the partial cavity of a mold part shortly before the mold is closed.
Figure 6:
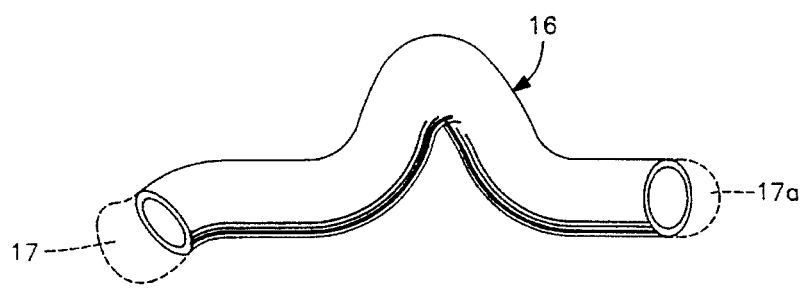
FIG. 6 a multiaxial hollow article made from a parison according to FIGS. 1–5.

FIG. 5 shows parison 10 positioned in the lower mold part 11 which is mounted on the mold supporting plate, namely shortly before the mold is closed by means of the upper mold part 15. After the mold has been closed, the blow medium, most of the time air, is introduced in the known manner by a blowing needle into the parison, whereby the latter is pressed against the wall of the cavity and the hollow plastic body 16 shown in FIG. 6 is molded with the desired shape to such a degree that it can then be removed from the mold, freed from end waste parts 3a and 3b and the bent finished tube is obtained by separating, e.g., beveling or sawing off the rounded end portions 17, 17a.

I claim:

1. A blow molding machine for producing multiaxial hollow plastic articles, said blow molding machine comprising a blow head for producing a heat-moldable tube arranged downstream of an extruder, a divided blow mold mounted in a mold closing support, said blow mold including a mold cavity into which a tubular piece is introduced as a parison and blown up to form a hollow plastic article after said blow mold has been closed, a premold movable between said blow head and a blowing station including said blow mold, said premold being matched in shape to a cavity of said blow mold and being provided with a mold trough open at a side of said blow head and displaceable at least in its tube receiving position below said blow head in two horizontal directions (X and Y axes) and positioned to be lifted and lowered in a vertical direction for the release of said parison over said cavity of a lower part of said blow mold by means for dropping the parison from said mold trough into said lower part of said blow mold.

2. A blow molding machine according to claim 1, wherein said premold is mounted on a lightweight frame.

3. A blow molding machine according to claim 1, wherein a bottom of said premold includes said means having at least one pivotable bottom door.

4. A blow molding machine according to claim 3 wherein said at least one bottom door of said premold is comprised of door segments to correspond to a curvature of said mold trough.

5. A blow molding machine according to claim 4, wherein said at least one bottom door has the shape of a rake, with two of said at least one door meshing with one another in their closed state, thereby filling gaps thereinbetween.

6. A blow molding machine according to claim 1, wherein a bottom of said premold includes at least one sheet which is laterally displaceable in the X axis.

7. A blow molding machine for producing multiaxial hollow plastic articles, said blow molding machine comprising a blow head for producing a heat-moldable tube arranged downstream of an extruder, a divided blow mold mounted in a mold closing support, said blow mold including a mold cavity into which a tubular piece is introduced as a parison and blown up to form a hollow plastic article after said blow mold has been closed a premold movable between said blow head and a blowing station including said blow mold, said premold being matched in shape to a cavity of said blow mold and being provided with a mold trough open at a side of said blow head and displaceable at least in its tube receiving position below said blow head in two horizontal directions (X and Y axes) and positioned to be lifted and lowered in a vertical direction for the release of said parison over said cavity of a lower part said blow mold, and a bottom of said premold including at least one pivotable bottom door for release of the parison into said lower part of said blow mold.

8. A blow molding machine according to claim 7, wherein said premold is mounted on a lightweight frame.

9. A blow molding machine according to claim 7 wherein said bottom of said premold is comprised of door segments corresponding to the curvature of said mold trough.

10. A blow molding machine according to claim 9, wherein said at least one bottom door has the shape of a rake.

11. A blow molding machine according to claim 7, wherein said bottom of said premold includes at least one sheet which is laterally displaceable in the X axis.

12. A blow molding machine for producing multiaxial hollow plastic articles, said blow molding machine comprising a blow head for producing a heat-moldable tube, a divided blow mold, said blow mold including a mold cavity into which a tubular piece is introduced as a parison and blown up to form a hollow plastic article, and a premold movable between said blow head and said blow mold, said premold having a shape matching a cavity of said blow mold and being provided with a mold trough open at a side of said blow head and displaceable at least in its tube receiving position below said blow head in a horizontal plane and positioned to be moved in a vertical direction for the release of said parison over said cavity of said blow mold by means for dropping the parison from a bottom of said mold trough into said cavity of said blow mold.

13. A blow molding machine according to claim 12, wherein said premold is mounted on a lightweight frame.

14. A blow molding machine according to claim 12, wherein said bottom of said premold includes at least one pivotable bottom door.

15. A blow molding machine according to claim 14, wherein at least one bottom door of said premold is comprised of door segments corresponding to a curvature of said mold trough.

16. A blow molding machine according to claim 15, wherein said at least one bottom door has the shape of a rake.

17. A blow molding machine according to claim 12, wherein said bottom of said premold includes at least one sheet which is laterally displaceable.

* * * * *